Figure 1:
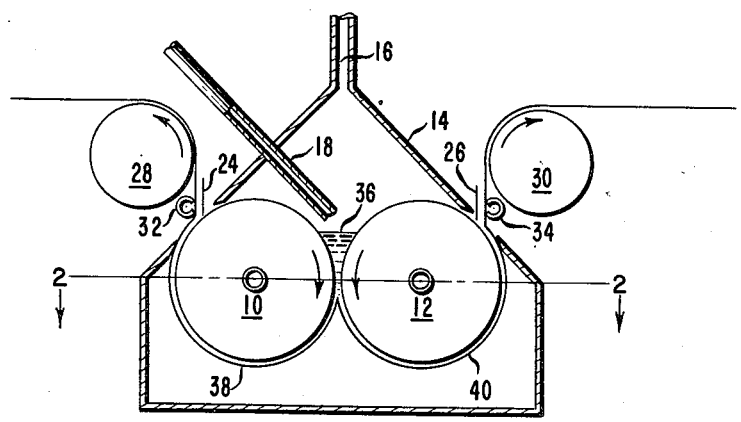

Feb. 9, 1960 J. KALIL 2,923,979
PRODUCTION OF SELF-SUPPORTING RETICULATE SHEET
OF CHLOROSULFONATED POLYMERS OF ETHYLENE
Filed Feb. 17, 1956

*Fig. 3*    *Fig. 4*    *Fig. 5*

INVENTOR
JAMES KALIL

BY *Edwin C. Woodhouse*
ATTORNEY

United States Patent Office 2,923,979
Patented Feb. 9, 1960

2,923,979

PRODUCTION OF SELF-SUPPORTING RETICULATE SHEET OF CHLOROSULFONATED POLYMERS OF ETHYLENE

James Kalil, Louisville, Ky., assignor to E. I. du Pont de Nemours and Company, Wilmington, Del., a corporation of Delaware Application February 17, 1956, Serial No. 566,166

12 Claims. (Cl. 18—57)

This invention relates to the isolation of chlorosulfonated polymers of ethylene from fluid solutions thereof in carbon tetrachloride.

Chlorosulfonated polyethylene, an important elastomer now used commercially, is ordinarily made by treating a dilute solution of polyethylene in carbon tetrachloride with chlorine and sulfur dioxide. See for example U.S. 2,586,363, of McAlevy. The product is usually isolated by removing the solvent by steam distillation. Thus, according to U.S. 2,592,814 of Ludlow, the dilute polymer solution is forced under pressure through an orifice and transversely into a steam jet directed across the orifice opening, the whole being submerged beneath the surface of water containing a colloidal dispersing agent and maintained at a pH above 7. The carbon tetrachloride is thus removed as vapor by the excess of steam and the polymer forms granular, crumb-like particles, dispersed in the water phase as a slurry. This is withdrawn, cooled, and filtered and the isolated crumbs are dried.

Although entirely practical, such methods have many disadvantages when considered for large scale production. Thus many separate steps are required, including the steam distillation; the condensation, separation and drying of the recovered solvent; and the filtration and drying of the polymer. Each involves a separate installation with its own initial cast and cost of maintaining and operating. The product is exposed to both air and water at elevated temperatures for a considerable time and may undergo some alteration even in the presence of stabilizers. There is a substantial loss of polymer in the form of "fines" which are not retained by the screen filters used. The porous crumbs produced by these processes, loosely consolidated into sheets, are bulky, have a large surface, and tend to stick together on storage and hence are far from an ideal form in which to be shipped and stored. Usually, they contain insoluble gel material whereby they do not form clear solutions in organic solvents. Also, they generally contain residual water which reduces their stability and increases their tendency to scorch during milling. One advantage, however, of such process of isolation is that the toxic carbon tetrachloride is completely removed by the distillation and drying steps or is reduced to a harmless level.

Drum-drying is known for removing volatile materials completely in one operation from dispersions and solutions but its successful use is limited to particular systems. Specifically, experience with the prior attempted isolation of elastomeric materials by drum-drying has not been promising.

Thus in the isolation of natural rubber from its latex, U.S. Patent No. 1,582,604, indicates that the water content cannot be reduced below 0.3% and that the rubber formed is soft and tacky and tends to adhere to the drying drum. It cannot be handled as an isolate self-supporting film and therefore many advantages of the drum-drying technique are lost.

Drum-drying has also been proposed in U.S. Patent No. 2,405,480 for isolating copolymers of olefines and diolefines from their solutions. Here the solvents, which boil below ordinary room temperatures, are rapidly removed on a revolving drum heated to 100–200° C. The polymers are then scraped off continuously with a knife and dropped into the hopper of an extruding machine in which they are further processed. A self-supporting film is not formed. In order for the knife to detach the polymer from the drum, the latter is continuously coated with an antitack liquid such as corn oil.

A serious disadvantage of drum-drying applied to elastomers as brought out in these patents is that a moderately volatile solvent cannot be completely removed without long heating at elevated temperatures. In the case of chlorosulfonated polyethylene which is made in carbon tetrachloride solution, it is essential that this toxic material be reduced to a safe level before the elastomer is sold. Also, the chlorosulfonated polyethylene has an extreme tendency to stick to metal surfaces, particularly at elevated temperatures of the order of 200° F. and above.

It is an object of this invention to provide a novel process for isolating certain chlorosulfonated polymers of ethylene from fluid solutions thereof in carbon tetrachloride. Another object is to provide such a process which is simple, economical and efficient and which produces the chlorosulfonated polymers in the form of self-supporting reticulate sheets which have novel advantageous properties. A further object is to provide such a process wherein the chlorosulfonated polymer is dried on a heated metal surface in such a manner that the polymer is rapidly isolated and is readily removable from the metal drying surface, and degradation of the polymer is largely or completely avoided. Still further objects will appear hereinafter.

The above and other objects are accomplished by this invention wherein a film of a fluid solution of a chlorosulfonated polymer of ethylene in carbon tetrachloride is applied to a moving smooth inert metal surface which is maintained at a temperature between 100° C. and about 200° C. and under an ambient pressure not greater than atmospheric pressure, maintaining the film on said heated surface until the carbon tetrachloride content of the film has been reduced to not more than about 3%, and then separating the dried film of chlorosulfonated polymer from the heated metal surface in the form of a self-supporting reticulate sheet; said chlorosulfonated polymer containing from 20% to about 40% chlorine and from 0.5% to about 4% sulfur and being derived from a polymer having a number average molecular weight of at least 8,000 and which is a member of the group consisting of polyethylene and copolymers of ethylene and a terminally unsaturated olefine of 3 to 6 carbon atoms.

In carrying out the process under the conditions set forth above, the film of polymer becomes greatly expanded and the dried film is quite porous, having a peculiar net-like or reticulate structure. Such film has a thickness about 10 times the thickness of non-porous, unexpanded films containing the same weight of material per unit area. This is quite unlike the films usually obtained in the drum-drying of organic solutions of other materials, such as nitrocellulose films.

The carbon tetrachloride is removed from the films very readily and rapidly, in about 1 to 10 seconds, most rapidly at the higher temperatures. Also, due to the reticulate structure of the dried films, they cool rapidly after being separated from the hot metal surfaces. Therefore, the chlorosulfonated polymers are subjected to the high temperatures for only very short periods of time. Thereby, the discoloration and the degradation with evolution of hydrogen chloride, ordinarily occurring during isolation by prior methods which subject the chlorosulfonated polymers to elevated temperatures over substantially longer periods of time, are avoided.

When the films are dried by the process of this invention, they are easily stripped from the hot metal surfaces in the form of continuous, porous, reticulate, self-supporting sheets, which can be handled mechanically in a variety of ways. This was not obvious because it is well known that chlorosulfonated polymers of ethylene have a strong tendency to stick to metal surfaces, such tendency increasing with increasing temperatures, particularly at temperatures of about 200° F. (93° C.) and above. The films can be converted into compact forms suitable for packaging and storage and convenient for final processing into articles of manufacture. The reticulate film structure greatly assists a further separate final drying step, when needed or desired.

The process may be carried out in a wide variety of types and forms of equipment, such as drum-driers, endless belts, and the like, many of which are well known for the drying or casting of other materials from solutions or dispersions. Some representative types or forms of apparatus, suitable for carrying out the process, are illustrated diagrammatically in the accompanying drawings, in which Fig. 1 is a simplified view in vertical cross section of one form of apparatus, Fig. 2 is a view in horizontal cross section on line 2—2 of Fig. 1, Fig. 3 is a view showing an alternate arrangement and mode of operation of the drums of Fig. 1, Fig. 4 is a simplified view in vertical cross section of a form of apparatus employing a single drum, and Fig. 5 is a view similar to Fig. 4 but showing another mode of employing a single drum.

Figure 2:
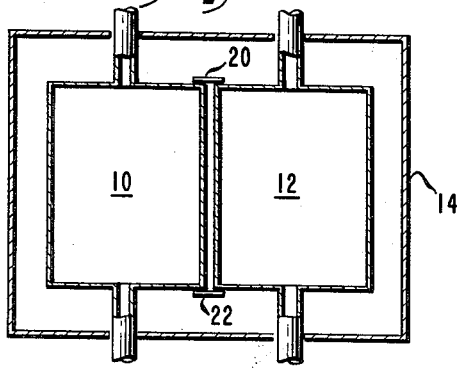
Figure 2:
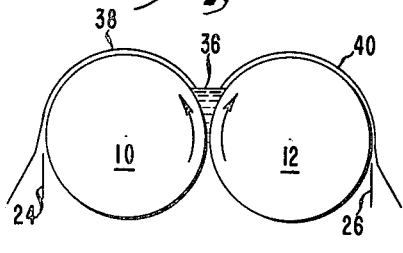
Figure 2:
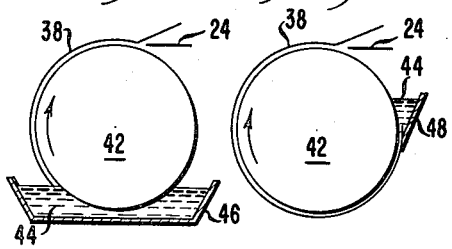

Referring first to the apparatus of Figures 1 and 2, two chromium-plated drums 10 and 12, each about 8 inches wide and about 6 inches in diameter on parallel axes are heated internally by steam in conventional manner. They are rotated at equal peripheral speeds in opposite directions as shown by the arrows and are separated from each other by a small adjustable distance forming a nip. Preferably, the drums are enclosed in a housing 14 provided with an outlet 16 which is connected with a conventional steam jet eductor (not shown) for removing carbon tetrachloride vapors and maintaining the system within the housing at a pressure slightly below atmospheric. The housing is heated, e.g., by widely spaced steam pipes, to prevent condensation of carbon tetrachloride therein, preferably to about 80° C. An inlet pipe 18 passes through the housing, near the top thereof, and terminates above the nip of the drums. Closely fitting end boards or dams 20 and 22 are provided at the ends of the drums to prevent solution from escaping laterally from the nip of the drums. Knives 24 and 26 are positioned about 45° from the tops of the drums on the sides thereof remote from the nip and press firmly against the surfaces of the drums so as to aid in separating the sheets of dried material from those surfaces. The housing contains openings adjacent the knives to accommodate the knives and permit the separated sheets to pass out of the housing, the edges of such openings fitting snugly against the drums and the sheets of material thereon so as to prevent the escape of carbon tetrachloride through the openings into the surrounding atmosphere. Reels 28 and 30, located outside the housing in the vicinity of the openings for the sheet material, engage the sheet material, are rotated in cooperation with the drums and assist in removing the sheet material from the drums.

The sheet material, on leaving the housing, may be subjected to a current of air or other inert gas, preferably at ordinary temperature, introduced through perforated pipes 32 and 34, to assist in removing residual solvent and to cool the sheet material and render it less plastic and easier to handle.

In operation, the housing 14 is heated to about 80° C. and steam is passed through the rotating drums to heat them to from 1000 C. to about 2000 C. and to maintain them at that temperature. A solution of chlorosulfonated polymer in carbon tetrachloride is introduced through inlet pipe 18 and into the nip of the drums at a rate to maintain the nip partly filled with the solution as shown at 36, the solution being prevented from escaping at the ends by the end boards or dams 20 and 22. Some boiling of the carbon tetrachloride from the solution takes place in the nip. The solution is carried downward by the drums and becomes distributed equally thereon in the form of films 38 and 40 from which the carbon tetrachloride is rapidly removed by the heat from the drums. By the time that the films reach the knives 24 and 26, all or nearly all of the carbon tetrachloride has been evaporated from the films. The knives 24 and 26 scrape such films from the drums in the form of self-supporting sheets having a reticulated structure. The sheets pass over the reels 28 and 30 which apply a slight traction to assist in removing the sheets from the drums. During such operation, the vaporized carbon tetrachloride is withdrawn through the outlet 16 and passed to a system (not shown) for its recovery by condensation, adsorption, or other conventional method.

Figure 3 shows drums 10 and 12, similar to those in Figs. 1 and 2, but rotated in the opposite direction and set in close contact. The nip is maintained partly filled with the solution of chlorosulfonated polymer. The drums carry films 38 and 40 of solution upward out of the nip. The heat from the drums rapidly vaporizes the carbon tetrachloride so that the films are in the form of reticulate self-supporting sheets containing little or no carbon tetrachloride by the time that they approach the lower portions of the drums where they are separated from the drums by knives 24 and 26, similar to those of Fig. 1. Preferably, the rolls are enclosed in a housing (not shown) similar to 14 of Figs. 1 and 2, except that the openings for the knives and for removal of the sheets are positioned in the lower portion of the housing at the points at which the sheets are removed from the drums.

Figure 4 shows a single drum 42, similar to one of the drums 10 and 12, and a reservoir 44 of the solution of chlorosulfonated polymer in a pan or trough 46. The drum 42 dips into the reservoir 44 and picks up a film of the solution and carries it up to the top of the drum while the heat from the drum vaporizes all or most of the carbon tetrachloride from the film. The resulting reticulate, self-supporting sheet is separated from the drum by a knife 24 as in the apparatus of Fig. 1. Preferably, the drum 42, reservoir 44 and pan or trough 46 are enclosed in a housing similar to that of Figs. 1 and 2 but with only the one necessary opening for accommodating the knife 24 and for removing the sheet of chlorosulfonated polymer.

Figure 5 is similar to Fig. 4, except that the reservoir 44 is placed on the side of the drum. This reservoir is formed by a trough 48 positioned against the side of the drum and having the side nearest the drum open so that the solution is in contact with the drum surface.

It will be understood that the specific form or type of apparatus forms no part of this invention, it being well known and conventional in drum driers for other materials. The solution of chlorosulfonated polymer may be sprayed on the drum or drums. Also, instead of the drum or drums, a moving, continuous, flexible, horizontal, endless, heated belt may be used, applying the solution at one point and removing the sheet of polymer at another point, the two points being positioned a sufficient distance apart to permit effective evaporation of the carbon tetrachloride from the film during its travel between those points. It is important only that the surface upon which the solution is deposited and dried be formed of a metal that is resistant to corrosion by the ingredients of the solutions and that it be smooth and free of irregularities, preferably polished. Chromium, nickel and stainless steel are illustrative of the suitable metals.

The heating of the continuous metal surface upon which the solution is evaporated may be brought about in various ways, for example electrically or by fuel burners, but most conveniently, when drums are used, by circulating steam or a heat exchange liquid through them. Infra-red radiation devices may be used additionally to advantage, for heating the film either on the drum or after it has been removed therefrom.

The reels 28 and 30 are not essential and may be omitted, but usually will be preferred. The perforated pipes 32 and 34 and the air or equivalent gas currents provided by them are not essential and may be omitted. They are desirable where cooling or removal of residual solvent is desired. Alternatively, the sheets may be passed through a conventional drying chamber with air or other inert gas circulation. The film may be supported, when moved horizontally, by rollers, reels, or open belts. When traveling vertically, except for long distances, no support is ordinarily required. The continuous film is very suitable for being formed into a continuous rope and then cut into pieces of convenient length and packaged, using for example, equipment described for use with neoprene in U.S. 2,349,829. It is thus converted into a form for storage, shipping and final use which is compact, presents a small surface, and may be conveniently weighed out and handled by the purchaser in compounding and further manufacturing steps.

The chlorosulfonated polymers of ethylene, to be treated according to this invention, preferably contain from 20% to about 40% by weight of chlorine and from 0.5% to about 4% by weight of sulfur, the sulfur being in the form of —$SO_2Cl$ groups. The polymers of ethylene, from which the chlorosulfonated polymers are derived, have a number average molecular weight of at least 8,000, preferably of 8,000 to about 60,000. Such polymers of ethylene are members of the group consisting of polyethylene (homopolymers of ethylene) and copolymers of ethylene and a terminally unsaturated olefine of 3 to 6 carbon atoms, such as propene, 1-butene, 1-pentene and hexene. Polymers, with much lower molecular weights, are too soft to handle conveniently.

The solutions to be employed must be of such concentration that they are sufficiently fluid at the operating temperatures to flow readily. Concentrations as low as 1% by weight of chlorosulfonated polymer can be readily handled. Preferably, the concentrations will be in the range of from about 8% to about 25%.

The metal surface, on which the film is formed and from which the dried sheet is separated, must be maintained at a temperature between 100° C. and about 200° C. (212–397° F.), preferably from about 150° C. to about 175° C. Temperatures materially above 200° C. tend to cause degradation of the chlorosulfonated polymer. Temperatures below 100° C. fail to produce dried films of the desired porous or reticulate structure and which can be readily separated from the hot metal surfaces, particularly as a self-supporting sheet. For example, when a solution of chlorosulfonated polyethylene in carbon tetrachloride was dried at a temperature between 60° C. and 70° C. on large chromium-plated drums, the dried film was unexpanded, non-porous, adhered firmly to the drum surface, and could not be separated from the metal surface except with great difficulty or by the injection of a special parting agent under the film; such temperature being that at which the film was expected to adhere much less firmly and to have far greater strength.

The heated metal surface is moved at such a rate that most of the solvent is evaporated from the film and its solvent content is reduced to about 3% or less, preferably below 3%, before it reaches the point at which it is separated from the metal surface. As explained above, it is easy, because of the porous nature of the film, to reduce the residual solvent below 0.1% and, if desired, to practically eliminate it while the film is still on the heated metal surface, without bringing about any deleterious alteration in the chlorosulfonated polymer. It is sometimes advantageous, however, not to remove all of the solvent while the film is on the heated surface but to remove the residue from the isolated film after separation from the metal surface by separate heating or treatment with a current of air or other inert gas. The porous nature of the film and its adaptability to being treated continuously while unsupported make this after-treatment practical.

The removal of the solvent is helped by increasing the temperature of the heated surface, by decreasing the partial or total pressure of solvent, by increasing the time of contact and, usually, by decreasing the weight of material produced per unit area. Thus, considering a drum drier revolving at a fixed rate, the weight of material produced per unit area may be decreased and consequently the residual solvent content of the product may be decreased by reducing the rate of feed of the solution, the spacing between the drums in the apparatus being correspondingly narrowed so that the solution is still retained in the nip and the film thickness is reduced. The residual solvent content may also be decreased by reducing the speed of rotation of the drum, thus increasing the contact time. The residual solvent content is less when the carbon tetrachloride partial pressure in contact with the drying film is reduced, as by dilution with air. The drying rate is faster for the more concentrated solutions.

The thickness of the film may be widely varied, provided that the time on the drum and the temperature are great enough to reduce the solvent content to the desired extent. Films between about 1 and 30 mils in actual thickness have been readily handled. Preferably, the dried films will have a thickness of from about 2 to about 8 mils. Thus, a wide variety of conditions may be used to get a film containing, for example, 3% residual solvent, which is the preferred upper limit. More strenuous conditions, according to the principles discussed above, are used when more complete drying is required.

In order to more clearly illustrate this invention, preferred modes of practicing the process, and the advantageous results to be obtained thereby, the following examples are given in which the proportions are by weight, except where specifically stated otherwise:

Example 1

The apparatus, illustrated in Figures 1 and 2 of the drawings but without the preferred pipes 32 and 34, was employed to treat solutions of a chlorosulfonated polyethylene which contained 27.5% chlorine and 1.5% sulfur and in which the polyethylene had a number average molecular weight of about 18,000. The chlorosulfonated polyethylene was supplied as a 11.7% solution in carbon tetrachloride and was stabilized by means of 0.5% of a condensation product of two mols of epichlorhydrin with one mol of p,p'-dihydroxydiphenyl dimethyl methane. The solution was fed to the nip of the drums at the rate of 7.6 lbs. of the polymer per hour. The drums were kept at 170° C. (338° F.) and rotated at 15 r.p.m. The drum surfaces were therefore coated with 0.0042 lbs. of chlorosulfonated polyethylene per square foot of surface. After drying and separation from the hot drums, a self-supporting sheet resulted, containing 0.10% carbon tetrachloride. The sheet was smooth, uniform, and practically colorless and transparent but under the microscope showed the reticulate structure referred to hereinbefore. Although not sufficiently tacky to stick to the reels and other handling equipment, the sheet could be readily formed into a compact, continuous rope. The actual measured dry thickness was about 8 mils. The thickness of a corresponding non-porous film calculated from the above data, would have been 0.74 mil.

The following table illustrates conditions under which sheets, containing somewhat less than 3% solvent, have been obtained, using the chlorosulfonated polyethylene, equipment, and procedure of Example 1.

| Concentration of Solution, Percent | R.p.m. of Drums | Lbs. of polymer fed per hr. | Temp. of Drums, ° C. |
| --- | --- | --- | --- |
| 34 | 18.5 | 5.0 | 150 |
| 25 | 38 | 4.5 | 163 |
| 25 | 14 | 3.8 | 142 |
| 18 | 14 | 4.0 | 142 |
| 18 | 14 | 3.9 | 153 |
| 11.7 | 14 | 3.2 | 153 |
| 11.7 | 10 | 2.8 | 142 |

*Example 2*

Using the same apparatus and chlorosulfonated polyethylene as in Example 1, a 25% solution of the stabilized polymer in carbon tetrachloride was fed at the rate of 17.0 lbs. of polymer per hr., and the drums, heated to 325° F. (163° C.) were rotated at 38 r.p.m. The resulting films were self-supporting and contained 2.81% carbon tetrachloride. The actual dried film thickness was about 7 mils.

*Example 3*

Under the conditions and with the materials and equipment of Example 2 but with the drums at 370° F. (188° C.), 13.4 lbs. of polymer were fed per hour and the resulting dried film contained 0.33% carbon tetrachloride. The actual dried film thickness was about 5 mils.

*Example 4*

A solution of the chlorosulfonated polyethylene of Example 1 was treated in the apparatus of Figure 5. The drum temperature was 220° F. (104° C.), and the speed 0.5 r.p.m. The polymer was fed at the rate of 0.41 lb. per hr. as an 11% solution in carbon tetrachloride. The dried self-supporting sheet obtained contained 0.43% carbon tetrachloride and had an actual thickness of about 2 mils.

*Example 5*

A solution of the chlorosulfonated polyethylene of Example 1 was treated in the apparatus of Figure 4. A self-supporting film containing 0.43% carbon tetrachloride was obtained at the rate of 4.76 lbs. per hr. The solution concentration was 8%, the temperature 170° C., and the drum rotated at 72 r.p.m.

*Example 6*

Using the equipment of Example 1, at 274° F. (134° C.), 36 g. of a chlorosulfonated ethylene-propylene copolymer, containing 20% Cl and 1.2% S and in which the copolymer had a number average molecular weight of about 50,000, dissolved in 1900 g. of carbon tetrachloride were fed during 18 minutes, with the drums rotating at 2 r.pm. Very light colored, self-supporting sheets, about 2 mils thick and containing practically no carbon tetrachloride, were separated from the drums.

The products of this invention are superior in a number of respects to corresponding products isolated from solution by steam distillation of the carbon tetrachloride, followed by drying to remove water. They are lighter in color, form clear solutions in organic solvents, are free from insoluble gel material, and are free of water. This last property is of great importance, since it improves stability, particularly of compounded stocks and reduces their tendency to scorch during milling. Moreover, the product, provided quality of the starting solution is constant, is very uniform over the whole period of operation. The compacted ropes and the "chips" (made by cutting the ropes into short lengths) are much more compact for storage and shipping than the porous sheets of crumbs previously available, and are much more convenient for the customer to use in compounding operations. Since they present a smooth, continuous surface they can be readily coated with talc to overcome their tendency to stick together on storage.

It will be understood that the examples heretofore presented are given for illustrative purposes solely, and that this invention is not limited to the specific embodiments described therein. On the other hand, it will be obvious to those skilled in the art that many variations and modifications can be made therein, such as in the equipment, conditions, chlorosulfonated polymers, and proportions employed, within the limits set forth in the general description, without departing from the spirit and scope of this invention.

It will be apparent that this invention provides a novel process for the direct isolation of chlorosulfonated polymers of ethylene from their solutions in carbon tetrachloride which process is continuous, simple and easy to operate, practical and economical. It produces a superior product of novel form which is easier to handle and use. Therefore, this invention constitutes a valuable advance in and contribution to the art.

The embodiments of the invention in which an exclusive property or privilege is claimed are defined as follows:

1. The process for isolating a chlorosulfonated polymer in the form of a self-supporting reticulate sheet from fluid solutions of said chlorosulfonated polymer in carbon tetrachloride, said chlorosulfonated polymer containing from 20% to about 40% chlorine and from 0.5% to about 4% sulfur and being derived from a polymer having a number average molecular weight of at least 8,000 which is a member of the group consisting of polyethylene and copolymers of ethylene and a terminally unsaturated olefine of 3 to 6 carbon atoms, which process comprises applying a film of said solution to a moving smooth inert metal surface maintained at a temperature between 100° C. and about 200° C. and under an ambient pressure not greater than atmospheric pressure, maintaining the film on said heated surface until the carbon tetrachloride content of the film has been reduced to not more than about 3%, and then separating the dried film of chlorosulfonated polymer from the heated metal surface in the form of a self-supporting reticulate sheet.

2. The process for isolating a chlorosulfonated polymer in the form of a self-supporting reticulate sheet from fluid solutions of said chlorosulfonated polymer in carbon tetrachloride, said chlorosulfonated polymer containing from 20% to about 40% chlorine and from 0.5% to about 4% sulfur and being derived from a polymer having a number average molecular weight of 8,000 to about 60,000 which is a member of the group consisting of polyethylene and copolymers of ethylene and a terminally unsaturated olefine of 3 to 6 carbon atoms, which process comprises applying a film of said solution to a moving smooth inert metal surface maintained at a temperature between 100° C. and about 200° C. in a chamber maintained at a subatmospheric pressure, maintaining the film on said heated surface in said chamber until the carbon tetrachloride content of the film has been reduced to not more than about 3%, and then separating the dried film of chlorosulfonated polymer from the heated metal surface in the form of a self-supporting reticulate sheet.

3. The process for isolating a chlorosulfonated polymer in the form of a self-supporting reticulate sheet from fluid solutions of said chlorosulfonated polymer in carbon tetrachloride, said chlorosulfonated polymer containing from 20% to about 40% chlorine and from 0.5% to about 4% sulfur and being derived from a polymer having a number average molecular weight of 8,000 to about 60,000 which is a member of the group consisting of polyethylene and copolymers of ethylene and a terminally unsaturated olefine of 3 to 6 carbon atoms, which process comprises applying a film of said solution to a moving smooth polished inert metal surface maintained at a temperature between 100° and about 200° C. in a chamber maintained at a subatmospheric pressure, maintaining the film on said heated surface in said chamber until the carbon tetrachloride content of the film has been reduced to less than 3%, and then separating the dried film of chlorosulfonated polymer from the heated metal surface in the form of a self-supporting reticulate sheet.

4. The process for isolating a chlorosulfonated polymer in the form of a self-supporting reticulate sheet from fluid solutions of said chlorosulfonated polymer in carbon tetrachloride, said chlorosulfonated polymer containing from 20% to about 40% chlorine and from 0.5% to about 4% sulfur and being derived from a polymer having a number average molecular weight of 8,000 to about 60,000 which is a member of the group consisting of polyethylene and copolymers of ethylene and a terminally unsaturated olefine of 3 to 6 carbon atoms, which process comprises applying a film of said solution to a moving smooth inert metal surface maintained at a temperature of from about 150° C. to about 175° C. in a chamber maintained at a subatmospheric pressure, maintaining the film on said heated surface in said chamber until the carbon tetrachloride content of the film has been reduced to not more than about 3%, and then separating the dried film of chlorosulfonated polymer from the heated metal surface in the form of a self-supporting reticulate sheet.

5. The process for isolating a chlorosulfonated polyethylene in the form of a self-supporting reticulate sheet from fluid solutions of said chlorosulfonated polymer in carbon tetrachloride, said chlorosulfonated polyethylene containing from 20% to about 40% chlorine and from 0.5% to about 4% sulfur and being derived from polyethylene having a number average molecular weight of at least 8,000, which process comprises applying a film of said solution to a moving smooth inert metal surface maintained at a temperature between 100° C. and about 200° C. and under an ambient pressure not greater than atmospheric pressure, maintaining the film on said heated surface until the carbon tetrachloride content of the film has been reduced to not more than about 3%, and then separating the dried film of chlorosulfonated polyethylene from the heated metal surface in the form of a self-supporting reticulate sheet.

6. The process for isolating a chlorosulfonated polyethylene in the form of a self-supporting reticulate sheet from fluid solutions of said chlorosulfonated polymer in carbon tetrachloride, said chlorosulfonated polyethylene containing from 20% to about 40% chlorine and from 0.5% to about 4% sulfur and being derived from polyethylene having a number average molecular weight of 8,000 to about 60,000, which process comprises applying a film of said solution to a moving smooth inert metal surface maintained at a temperature between 100° C. and about 200° C. in a chamber maintained at a subatmospheric pressure, maintaining the film on said heated surface in said chamber until the carbon tetrachloride content of the film has been reduced to not more than about 3%, and then separating the dried film of chlorosulfonated polyethylene from the heated metal surface in the form of a self-supporting reticulate sheet.

7. The process for isolating a chlorosulfonated polyethylene in the form of a self-suporting reticulate sheet from fluid solutions of said chlorosulfonated polymer in carbon tetrachloride, said chlorosulfonated polyethylene containing from 20% to about 40% chlorine and from 0.5% to about 4% sulfur and being derived from polyethylene having a number average molecular weight of 8,000 to about 60,000, which process comprises applying film of said solution to a moving smooth polished inert metal surface maintained at a temperature between 100° C. and about 200° C. in a chamber maintained at a subatmospheric pressure, maintaining the film on said heated surface in said chamber until the carbon tetrachloride content of the film has been reduced to less than 3%, and then separating the dried film of chlorosulfonated polyethylene from the heated metal surface in the form of a self-supporting reticulate sheet.

8. The process for isolating a chlorosulfonated polyethylene in the form of a self-supporting reticulate sheet from fluid solutions of said chlorosulfonated polymer in carbon tetrachloride, said chlorosulfonated polyethylene containing from 20% to about 40% chlorine and from 0.5% to about 4% sulfur and being derived from polyethylene having a number average molecular weight of 8,000 to about 60,00, which process comprises applying a film of said solution to a moving smooth inert metal surface maintained at a temperature of from about 150° C. to about 175° C. in a chamber maintained at a subatmospheric pressure, maintaining the film on said heated surface in said chamber until the carbon tetrachloride content of the film has been reduced to not more than about 3%, and then separating the dried film of chlorosulfonated polyethylene from the heated metal surface in the form of a self-supporting reticulate sheet.

9. The process for isolating a chlorosulfonated polymer in the form of a self-supporting reticulate sheet from fluid solution of said chlorosulfonated ploymer in carbon tetrachloride, said chlorosulfonated polymer containing from 20% to about 40% chlorine and from 0.5% to about 4% sulfur and being derived from a polymer having a number average molecular weight of at least 8,000 which is a member of the group consisting of polyethylene and copolymers of ethylene and a terminally unsaturated olefine of 3 to 6 carbon atoms, which process comprises applying a film of said solution to the surface of a rotating drum having a smooth inert metal surface maintained at a temperature between 100° C. and about 200° C. and under an ambient pressure not greater than atmospheric pressure, maintaining the film on said heated surface until the carbon tetrachloride content of the film has been reduced to not more than about 3%, and then separating the dried film of chlorosulfonated polymer from the heated metal surface in the form of a self-supporting reticulate sheet.

10. The process for isolating a chlorosulfonated polymer in the form of a self-supporting reticulate sheet from fluid solutions of said chlorosulfonated polymer in carbon tetrachloride, said chlorosulfonated polymer containing from 20% to about 40% chlorine and from 0.5% to about 4% sulfur and being derived from a polymer having a number average molecular weight of 8,000 to about 60,000 which is a member of the group consisting of polyethylene and copolymers of ethylene and a terminally unsaturated olefine of 3 to 6 carbon atoms, which process comprises applying a film of said solution to the surface of a rotating drum having a smooth inert metal surface maintained at a temperature of from about 150° C. to about 175° C. in a chamber maintained at a subatmospheric pressure, maintaining the film on said heated surface in said chamber until the carbon tetrachloride content of the film has been reduced to not more than about 3%, and then separating the dried film of chlorosulfonated polymer from the heated metal surface in the form of a self-supporting reticulate sheet.

11. The process for isolating a chlorosulfonated polyethylene in the form of a self-supporting reticulate sheet from fluid solutions of said chlorosulfonated polymer in carbon tetrachloride, said chlorosulfonated polyethylene containing from 20% to about 40% chlorine and from 0.5% to about 4% sulfur and being derived from polyethylene having a number average molecular weight of at least 8,000, which process comprises applying a film of said solution to the surface of a rotating drum having a smooth inert metal surface maintained at a temperature between 100° C. and about 200° C. and under an ambient pressure not greater than atmospheric pressure, maintaining the film on said heated surface until the carbon tetrachloride content of the film has been reduced to not more than about 3%, and then separating the dried film of chlorosulfonated polyethylene from the heated metal surface in the form of a self-supporting reticulate sheet.

12. The process for isolating a chlorosulfonated polyethylene in the form of a self-supporting reticulate sheet from fluid solutions of said chlorosulfonated polymer in carbon tetrachloride, said chlorosulfonated polyethylene containing from 20% to about 40% chlorine and from 0.5% to about 4% sulfur and being derived from polyethylene having a number average molecular weight of 8,000 to about 60,000, which process comprises applying a film of said solution to the surface of a rotating drum having a smooth inert metal surface maintained at a temperature of from about 150° C. to about 175° C. in a chamber maintained at a subatmospheric pressure, maintaining the film on said heated surface in said chamber until the carbon tetrachloride content of the film has been reduced to not more than about 3%, and then separating the dried film of chlorosulfonated polyethylene from the heated metal surface in the form of a self-supporting reticulate sheet.

References Cited in the file of this patent

UNITED STATES PATENTS

| | | |
|---|---|---|
| 712,545 | Just | Nov. 4, 1902 |
| 1,403,556 | Lihme | Jan. 17, 1922 |
| 1,652,206 | Lahousse | Dec. 13, 1927 |
| 1,922,548 | Martin | Apr. 15, 1933 |
| 2,218,385 | Schulze | Oct. 15, 1940 |
| 2,345,013 | Soday | Mar. 28, 1944 |
| 2,497,376 | Swallow et al. | Feb. 14, 1950 |
| 2,592,814 | Ludlow | Apr. 15, 1952 |
| 2,628,945 | Wayne | Feb. 17, 1953 |
| 2,630,425 | Rodman | Mar. 3, 1953 |
| 2,681,321 | Stastny et al. | June 15, 1954 |

FOREIGN PATENTS

| | | |
|---|---|---|
| 123,074 | Australia | Dec. 11, 1946 |

OTHER REFERENCES

Expanded and Foamed Materials, "Plastics," August 1953 pp. 274–277; 18–48S.

"Styrene, Its Polymers, Copolymers and Derivatives"; Boundy-Boyer, Reinhold Publishing Corp., 1952; pp. 1173; TP 986 S7b6. (Copies in Div. 50 and Library.)

UNITED STATES PATENT OFFICE

CERTIFICATE OF CORRECTION

Patent No. 2,923,979                              February 9, 1960

James Kalil

It is hereby certified that error appears in the printed specification of the above numbered patent requiring correction and that the said Letters Patent should read as corrected below.

Column 1, line 40, for "cast" read -- cost --; column 4, line 5, for "1000 C. to about 2000 C." read -- $100°$ C. to about $200°$ C. --; column 6, line 56, for "preferred" read -- perforated -- column 10, line 32, for "ploymer" read -- polymer --.

Signed and sealed this 6th day of September 1960.

(SEAL)
Attest:

ERNEST W. SWIDER                                         ROBERT C. WATSON
Attesting Officer                                              Commissioner of Patents